Jan. 31, 1967   P. B. EYRE ET AL   3,301,765
NUCLEAR REACTOR FUEL ELEMENT ASSEMBLIES
Filed Nov. 30, 1964   3 Sheets-Sheet 1

United States Patent Office 3,301,765
Patented Jan. 31, 1967

3,301,765
NUCLEAR REACTOR FUEL ELEMENT
ASSEMBLIES
Philip Bernard Eyre, Lytham, and Charles Johnston,
Preston, England, assignors to United Kingdom Atomic
Energy Authority, London, England
Filed Nov. 30, 1964, Ser. No. 414,623
Claims priority, application Great Britain, Dec. 16, 1963,
49,662/63
4 Claims. (Cl. 176—78)

This invention relates to nuclear fuel assemblies such as comprise a plurality of elongate fuel elements supported in a bundle with their longitudinal axes parallel. It is conventional to cool such nuclear fuel assemblies by means of a stream of coolant medium, such as water which flows between the fuel elements in a direction parallel to their longitudinal axes. In such an assembly the individual fuel elements are mounted in a support structure by end locating grids and are spaced, intermediate their ends, one from another, by spacing grids which prevent radial deflection and bowing of the fuel elements. Such spacing grids can be of cellular form, penetrated by the fuel elements and having projecting locating members carried by the grid, the projecting locating members engaging with and locating the fuel elements uniformly spaced apart. The development of spacing grids for nuclear fuel assemblies has been concentrated on achieving a robust grid which offers small resistance to fluid flow and which is economical to fabricate whilst ensuring a high degree of accuracy in spacing of the fuel elements from each other. Another requirement of such grids is that overall thermal expansion of the fuel elements and relative to each other in the direction of their longitudinal axes must be accommodated. Longitudinal overall and relative thermal expansion of fuel elements in an assembly including spacing grids of the type having attached locating members in engagement with the fuel elements is normally accommodated by sliding occurring between the fuel element surface and the associated locating members of the grid. However, should jamming occur between the fuel element and the associated locating members of the grid, the grid will be subjected to stresses which may result in permanent distortion. Distortion of the grid will be particularly severe under thermal cycling conditions in which the fuel elements are subjected to repeated thermal expansions and contractions.

According to the invention in a nuclear fuel assembly including a plurality of elongate fuel elements supported in a bundle with their longitudinal axes parallel, spacing means are provided for spacing the fuel elements transversely one from another intermediate their ends, said spacing means comprising resilient spacer members located between adjacent fuel elements and a support structure carrying said resilient spacer members, said support structure being of skeletal form so as to cage the resilient spacer members whilst allowing bodily movement of the resilient spacer members between limits in the direction of the longitudinal axes of the fuel elements.

According to a further feature of the invention the support structure is of a form so as to cage the resilient spacer members whilst allowing bodily movement of the spacer members between limits in directions transverse to the longitudinal axes of the fuel elements.

In a particular form of the invention the support structure comprises a series of sinuous strips joined together to form a grid assembly of cellular form, each cell of the grid being penetrated by a fuel element, the resilient spacer members being in the form of spacer rings caged in apertures in the strips forming the grid, the spacer rings lying in a plane transverse to the longitudinal axes of the fuel elements, the dimension of the apertures in the direction parallel to the longitudinal axes of the fuel elements being greater than the depth of the spacer rings so that the spacer rings whilst being caged in the grid are movable relative to the grid in the direction of the longitudinal axes of the fuel elements, a clearance being provided between the circumferential surface of the spacer rings and the adjacent edges of the apertures in the strips so that the spacer rings are also movable relative to the grid in directions transverse to the longitudinal axes of the fuel elements.

In the above form of the invention the spacer rings may have an external surface of part spherical configuration so that overall longitudinal thermal expansion of the fuel elements is accommodated by bodily movement of the spacer rings relative to the grid in the direction of the longitudinal axes of the fuel elements and relative longitudinal thermal expansion of the fuel elements one to another is accommodated by tilting of the spacer rings in the grid.

One construction of nuclear fuel assembly employing spacing means in accordance with the invention will now be described by way of example with reference to the accompanying drawings in which.

Figure 1:
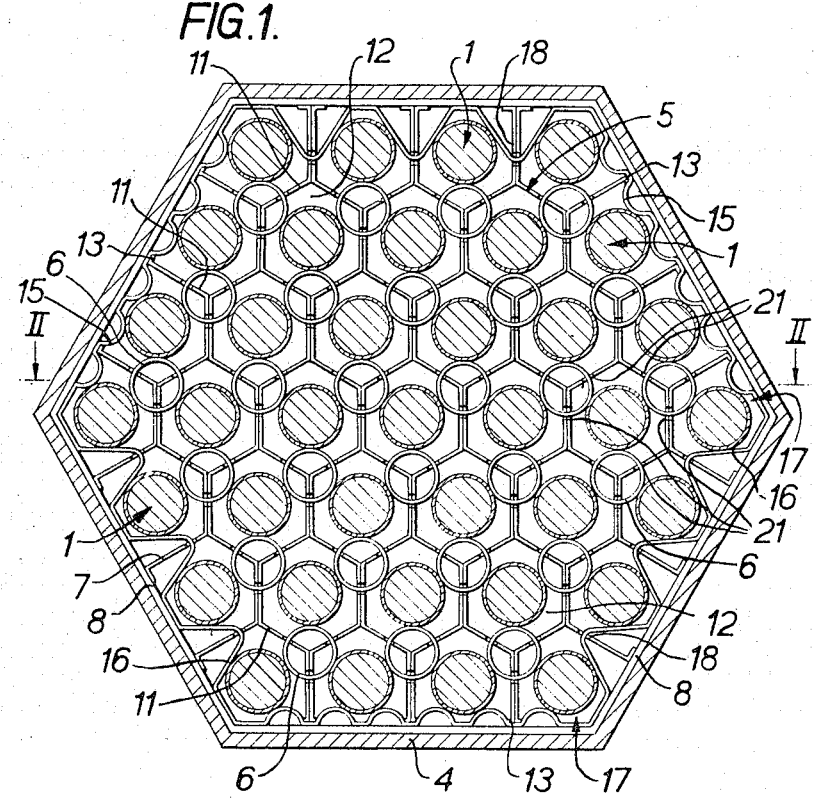
FIGURE 1 is a transverse cross section of the assembly.
Figure 2:
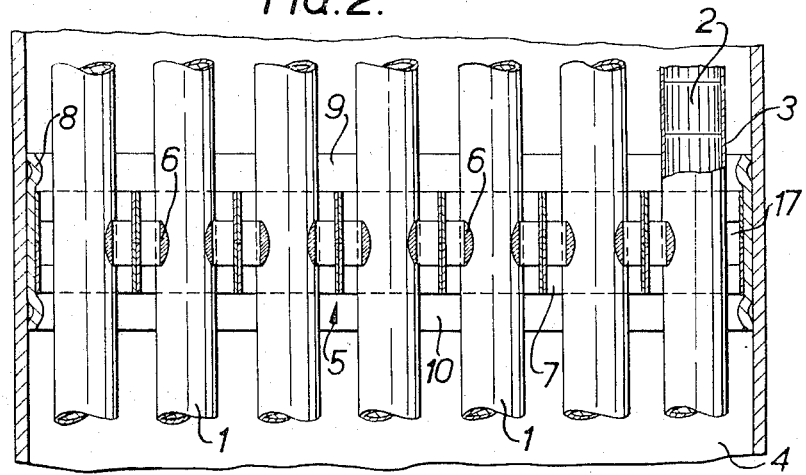
FIGURE 2 is a sectional elevation along the line II—II in FIGURE 1.
Figure 3:
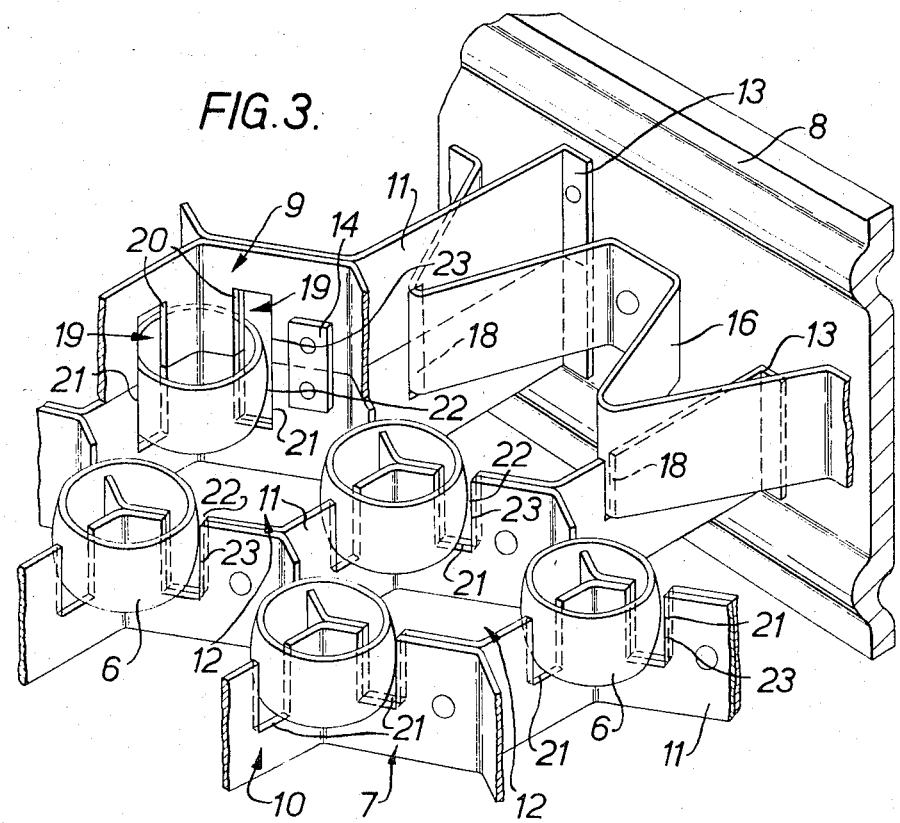
FIGURE 3 is a view in isometric form of the part of the assembly of FIGURES 1 and 2.
Figure 4:
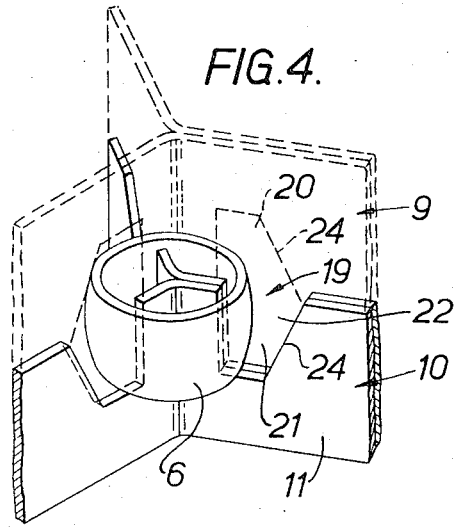
FIGURE 4 is an isometric view of an alternative form of the structure shown in FIGURE 3, and FIGURES 5 and 6 are sectional elevations similar to the sectional elevation of FIGURE 2 but showing an assembly of simplified form.

The nuclear fuel assembly shown in FIGURES 1 and 2 comprises thirty-seven fuel elements 1 of elongated form supported in a bundle with their longitudinal axes parallel. The fuel elements 1 each comprise a column of right cylindrical uranium dioxide pellets 2 stacked end to end within a thin-walled stainless steel sheath 3 and are arranged on a triangular pitch to form a bundle of hexagonal section. The fuel elements 1 are housed in a tubular housing 4 of hexagonal cross section and are supported in the housing 4 by end locating grids (not shown). Reactor coolant is passed through the housing 4 axially over the fuel elements 1 to effect cooling. The fuel elements 1 are spaced from one another intermediate their ends by spacing means 5 which prevent radial deflection and bowing of the fuel elements. The spacing means 5 comprise a lattice of ring shaped members 6 arranged on a triangular pitch, each of the ring shaped members 6 being positioned between three adjacent fuel elements 1. The ring shaped members 5 are caged in a support structure which is in the form of a cellular grid 7 penetrated by the fuel elements 1. The grid 7 has an outer band 8 of hexagonal cross section which is spot welded to the inner face of the housing 4. The grid 7 is formed in two parts, an upper part 9 and a lower part 10. Both the parts 9 and 10 of the grid 7 are of similar form and comprise a web of zig-zag strips 11 which are brazed or spot welded together to define thirty-seven hexagonal cells 12 each of which is penetrated by a fuel element 1. The strips 11 have flanges 13 which are brazed or spot welded to the outer band 8. As shown in FIGURE 3 the upper and lower parts 9 and 10 of the grid 7 are also joined by spot welded bridge pieces 14. Resilient edge spacers 15 and 16 of semicircular section and triangular section respectively are formed by bending of a strip 17 which is brazed or spot welded inside the outer band 8 of the grid 7. The ends of the zig-zag strips 11 forming the parts 9 and 10 of the grid have slots 18 accommodating the strip 17. The edge spacers 15 and 16 formed by the bends in the strip 17 contact the outer hexagonal ring of fuel elements 1. As shown in FIGURE 3 the ring shaped members 5 are retained in apertures 19 in the grid 7. Each of the apertures 19 is constituted by corresponding slots 20 and 21 in the strips 11 forming the upper and lower parts 9 and 10 of the grid 7. In the embodiment shown in FIGURE 3 the apertures 19 are of rectangular form and the dimension of the apertures 19 in the direction parallel to the longitudinal axes of the fuel elements 1 is greater than the depth of the ring shaped members 5. The apertures 19 are also of a width so as to provide a clearance 22 between the outer surface of the ring shaped members 5 and the edges 23 of the apertures 19 which are parallel to the longitudinal axes of the fuel elements 1. In the alternative form of structure shown in FIGURE 4 the apertures 19 have angled edges 24 which provide an increased clearance 22 between the outer surface of the ring shaped members 5 and the edges of the apertures 19.

As shown in FIGURES 2 and 3 the ring shaped members 6 have an outer surface of part spherical configuration.

The fuel assembly housing 4, the ring shaped members 6, the outer band 8 of the strips 11 and the strip 17 of the grid 7 are all fabricated from stainless steel.

Figure 5:
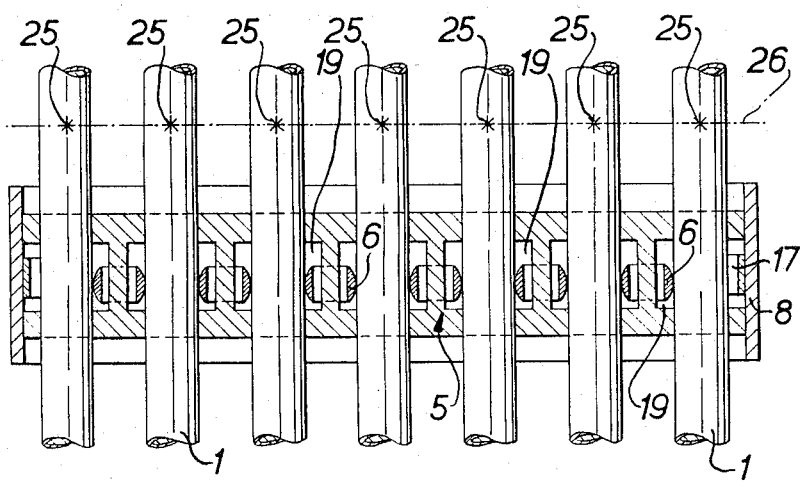
Figure 6:
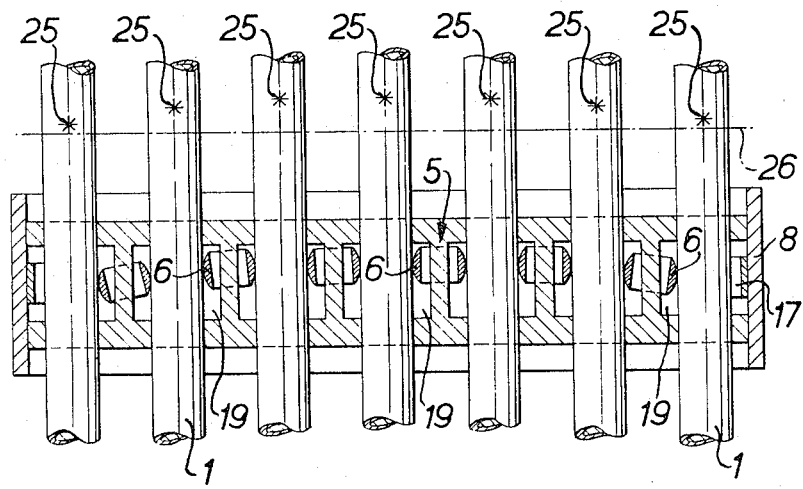

FIGURE 5 shows a sectional elevation of a simplified form of nuclear fuel assembly as manufactured and before use in a nuclear reactor. FIGURE 6 shows the assembly of FIGURE 5 as in use in a nuclear reactor. The nuclear fuel assembly embodies the features of the present invention in that it comprises a bundle of parallel elongate fuel elements 1 which are spaced apart intermediate their ends by spacer means comprising ring shaped spacer members 6 interposed between adjacent fuel elements 1 and retained in apertures 19 in a support structure 5. As assembled and before use of the nuclear fuel assembly in a nuclear reactor the ring shaped spacer members 6, as shown in FIGURE 5 all lie in a common transverse plane in the fuel assembly and the longitudinal axes of the ring shaped spacer members are parallel to the longitudinal axes of the fuel elements 1. In this condition reference points 25 marked on the fuel elements 1 all lie on the chain dotted reference line 26 in FIGURE 5. In FIGURE 6 the fuel assembly is shown as in use in a nuclear reactor. The fuel elements 1 during rise to reactor operating temperature have undergone overall longitudinal thermal expansion. FIGURE 6 shows the condition where, at operating temperature, a temperature gradient exists across the fuel assembly, the fuel elements 1 at the centre of the assembly being at a higher temperature than those at the edge of the assembly. Hence a degree of relative thermal expansion exists between the fuel elements 1 in passing from those located at the edge to those located at the centre of the assembly. The manner in which overall and relative longitudinal expansion of the fuel elements 1 has occurred is shown by the displacement of the reference points 25 on the fuel elements relative to the reference line 26 in FIGURE 6 compared with the alignment of the reference points 25 and the reference line 26 in FIGURE 5.

As shown in FIGURE 6 overall longitudinal expansion of the fuel elements 1 is accommodated by longitudinal movement of the ring shaped spacer members 6 in the apertures 19 of the support structure 7. Relative thermal expansion between the fuel elements 1 results in tilting of the ring shaped spacing members 6 in the apertures 19 of the support structure 7.

Besides the advantages of robustness and low resistance to fluid flow the spacing means of the invention possesses the advantage that longitudinal thermal expansion of the fuel elements can occur unhindered by the spacing means. This is to be compared with spacing grids of the type having attached locating members in engagement with the fuel elements. Jamming the fuel elements at their points of contact with the locating members in such as spacing grid can result in the setting up of stresses in the grid due to thermal expansion of the fuel elements. Such stresses can be sufficient to cause permanent distortion of the grid.

The spacing means of the invention provides a high accuracy of fuel element spacing whilst being economical to fabricate. Previously proposed spacing grids of cellular type with attached locating members depend for their accuracy of fuel element location on high accuracy of fabrication of the cellular grid. The need for high accuracy in grid manufacture makes for expense of grid fabrication. Accurate spacing of fuel elements by the spacing means of the invention is not dependent on high accuracy of manufacture of the grid 7 and hence the high cost of accurate grid manufacture is avoided. The accuracy of fuel element spacing provided by the spacing means of the invention is provided solely by accurate manufacture of the outerband 8 and the ring shaped locating members 6 which can be cheaply though accurately made by a simple machining operation.

Although described above in relation to an assembly of fuel elements arranged on a hexagonal lattice and employing ring shaped locating members it is envisaged that the spacing means of the invention is also applicable to other forms of fuel element assembly such as assemblies arranged on a square or circular lattice. It is also envisaged that the locating members 6 can be other than ring shaped depending on the requirements of fuel element location. For example the locating members may be of square, triangular, rectangular, polygonal, elliptical or trefoil cross-section.

Previously proposed forms of fuel element spacing grids need to be of high strength because fuel element location is directly dependent on such grids and the grids have also to be resistant to distortion under stresses imposed by thermal expansion and contraction of the fuel elements. In the case of the fuel element spacing means of the present inveniton the fuel elements are located by the ring shaped members 6 and the grid 7 does not provide any fuel element locating function in that it merely serves to cage the ring shaped members 6. Also the grid 7 is not subjected to stressing due to thermal expansion and contraction of the fuel elements. Therefore the grid 7 can be in the form of a low strength lightweight structure, so that compared with previous forms of fuel element spacing grids the amount of neutron absorbing material used in construction of the grid 7 is much reduced. Also the grid 7 can be made of materials of low neutron absorbing cross section which because of their low strength could not be employed in the manufacture of previously proposed forms of fuel element spacing grids. Also the grid 7 can be assembled by the accurate and time saving method of brazing. Brazing has hitherto been considered unsuitable for assembly of previously proposed forms of fuel element spacing grids because heating of the grids in carrying out the brazing operation results in an undesirable loss of strength in the grids.

We claim:

1. A nuclear fuel assembly including a plurality of elongate fuel elements supported in a bundle with their longitudinal axes parallel, spacing means being provided for spacing the fuel elements transversely one from another intermediate their ends, said spacing means comprising resilient spacer members located between adjacent fuel elements and a support structure carrying said resilient spacer members, said support structure being of skeletal form so as to cage the resilient spacer members while allowing bodily movement of the resilient spacer members between limits in the direction of the longitudinal axes of the fuel elements.

2. A nuclear fuel assembly as claimed in claim 1 wherein the support structure is of a form so as to cage the resilient spacer members while allowing bodily movement of the spacer members between limits in directions transverse to the longitudinal axes of the fuel element as well as allowing bodily movement of the spacer members between limits in the direction of the longitudinal axes of the fuel elements.

3. A nuclear fuel assembly including a plurality of elongate fuel elements supported in a bundle with their longitudinal axes parallel, spacing means being provided for spacing the fuel elements transversely one from another intermediate their ends, said spacing means comprising resilient spacer members located between adjacent fuel elements and a support structure carrying said resilient spacer members, said support structure comprising a series of sinuous strips joined together to form a grid assembly of cellular form, each cell of the grid being penetrated by a fuel element, the resilient spacer members being in the form of spacer rings caged in apertures in the strips forming the grid, the spacer rings lying in a plane transverse to the longitudinal axes of the fuel elements, the dimension of the apertures in the direction of the longitudinal axes of the fuel elements being greater than the depth of the spacer rings so that the spacer rings while being caged in the grid are movable relative to the grid in the direction of the longitudinal axes of the fuel elements, a clearance being provided between the circumferential surface of the spacer rings and the adjacent edges of the apertures in the strips so that the spacer rings are also movable relative to the grid in directions transverse to the longitudinal axes of the fuel elements.

4. A nuclear fuel assembly as claimed in claim 3 wherein the spacer rings have an external surface of part spherical configuration so that overall longitudinal thermal expansion of the fuel elements is accommodated by bodily movement of the spacer rings relative to the grid in the direction of the longitudinal axes of the fuel element sand relative longitudinal thermal expansion of the fuel elements one to another is accommodated by tilting of the spacer rings in the grid.

References Cited by the Examiner

UNITED STATES PATENTS 3,182,003  5/1965  Thorp et al. _____ 176—78

FOREIGN PATENTS 972,101  10/1964  Great Britain.
973,137  10/1964  Great Britain.

CARL D. QUARFORTH, *Primary Examiner.*

BENJAMIN R. PADGETT, *Examiner.*

M. J. SCOLNICK, *Assistant Examiner.*